Aug. 28, 1956   G. A. JUST   2,760,319
SELF-SERVICE COMPUTING DISPENSER
Filed Feb. 11, 1952   6 Sheets—Sheet 1

INVENTOR.
GEORGE A. JUST
BY
ATTORNEY.

Aug. 28, 1956  G. A. JUST  2,760,319
SELF-SERVICE COMPUTING DISPENSER
Filed Feb. 11, 1952  6 Sheets-Sheet 5

FIG. 5

INVENTOR.
GEORGE A. JUST
BY
ATTORNEY

Aug. 28, 1956  G. A. JUST  2,760,319
SELF-SERVICE COMPUTING DISPENSER
Filed Feb. 11, 1952  6 Sheets-Sheet 6

FIG. 10

INVENTOR.
GEORGE A. JUST
BY
ATTORNEY

United States Patent Office 2,760,319
Patented Aug. 28, 1956

2,760,319
SELF-SERVICE COMPUTING DISPENSER

George A. Just, Scarsdale, N. Y., assignor to The Grand Union Company, East Paterson, N. J., a corporation of Delaware Application February 11, 1952, Serial No. 271,039

18 Claims. (Cl. 53—167)

This invention relates to control equipment for dispensing compartments of self-serving stores.

The purpose of such control equipment is to permit a customer to select and receive desired items of merchandise from closed compartments upon the operation of a lock at any compartment by means of a key supplied to the customer. The key is constructed as part of a register which serves to record and totalize the selling prices of the several items selected and received by the customer. The register serves to provide a record of the number of items being purchased by the customer, and the total cost of those items, and, consequently, it is unnecessary for any further checking of the merchandise to be done by the clerks. They need merely check off the number of items according to the number already designated by the register and since the prices of the items are already totalized on the register, the merchandise items may be immediately packaged and delivered to the customer without any waiting in line in accordance with the present conventional requirements.

The two components required for such a system include the register key that is supplied to each customer, and the lock disposed to control the door of each display and delivery compartment. The keys are all alike and will fit all the locks.

The primary functions of the register key are to open the lock to release one merchandise item and to record the price of the item on the register. The register key thus serves both as a key and as an adding or subtracting machine element.

In addition, for the purpose of this invention, the key-register supports a receiving shell or compartment into or onto which a selected item of merchandise drops when the key is operated to open a display compartment containing the particular item of merchandise selected for purchase by a customer.

The locks are all similar in construction except for a variable price setting element which constitutes a coding device corresponding to the price of the items in the particular storage compartment whose display compartment is to be controlled by that lock. The locks are constructed to permit easy application and removal of the coding device by an authorized person.

The lock has these functions:

1. To prevent access to a display compartment until the lock has been operated to open the compartment door.
2. To prevent shoplifting or pilfering.
3. To permit progression of one merchandise item from the display compartment to the receiving compartment on the key register and to prevent admission of a subsequent merchandise item into the display compartment until the first merchandise item has been dispensed and the lock restored to its initial closed and locked position.
4. To require the customer to move the register key and the lock mechanism through a complete cycle of operation before the key may be removed from the lock, thereby to assure the restoration of the lock to its initial closed and locked position in the cycle after each initiating operation by a customer and assuring complete registration on the key mechanism.
5. To operate the register through the medium of a coded element on the lock in accordance with the price of the item of merchandise in the compartment controlled by the lock; and
6. To eliminate the need for marking each item of store merchandise since the customer will compare the marking on the merchandise chute with the amount on the key. Thus, the labor of placing or changing the price mark on each item of merchandise is obviated. Conventional price marking takes ten percent of store time.

The invention disclosed and described herein is directed to the lock structure whereby the various functions desired of it are accomplished.

The primary object of this invention is to provide a lock mechanism that shall be relatively simple and rugged in construction and that may be readily coupled to and uncoupled from the delivery end of any storage compartment.

Another object of this invention is to provide a control lock of the foregoing character in which a code or price setting element may be easily and readily inserted, the customer's key register then being operated by the price setting element in the lock according to the price of the item in the associated compartment and the price setting element in the lock may be readily removed to permit the substitution of a different price setting element. Each lock may thus be applied to control any storage compartment and to receive any price setting element.

Another object of the invention is to provide a lock that shall be difficult to operate without an authorized key.

Another object of the invention is to provide a combination lock and display chamber unit that may be readily applied and connected to a supply or storage compartment, and also readily disconnected and separated therefrom by an authorized person.

Still another object is to provide a lock and display chamber unit with a variable size coupling to a supply or storage compartment, to accommodate the transfer of merchandise items of various sizes.

A further object of the invention is to provide the register key for the lock with a receiving compartment for receiving the merchandise item from a display compartment, and the disposition of the display compartment to assure egression of a merchandise item from the display compartment once the lock is opened. Egression of an item of merchandise from a display compartment is assured by supporting the item on an inclined surface directly behind the lock so gravity will expel the item as soon as the door is moved to full open position.

A still further object of the present invention is to provide a lock mechanism of the foregoing character in which the lock must be operated through a predetermined cycle that will restore it to its initial operating position in closed condition before the customer's register key will be released, thereby utilizing the customer's services in restoring the lock to proper closed position for the subsequent customer and assuring complete registration on the key mechanism.

The arrangement of the system and the construction of the lock and the manner in which it is applied and performs its several functions are illustrated in the accompanying drawings in which.

Figures 1, 9:
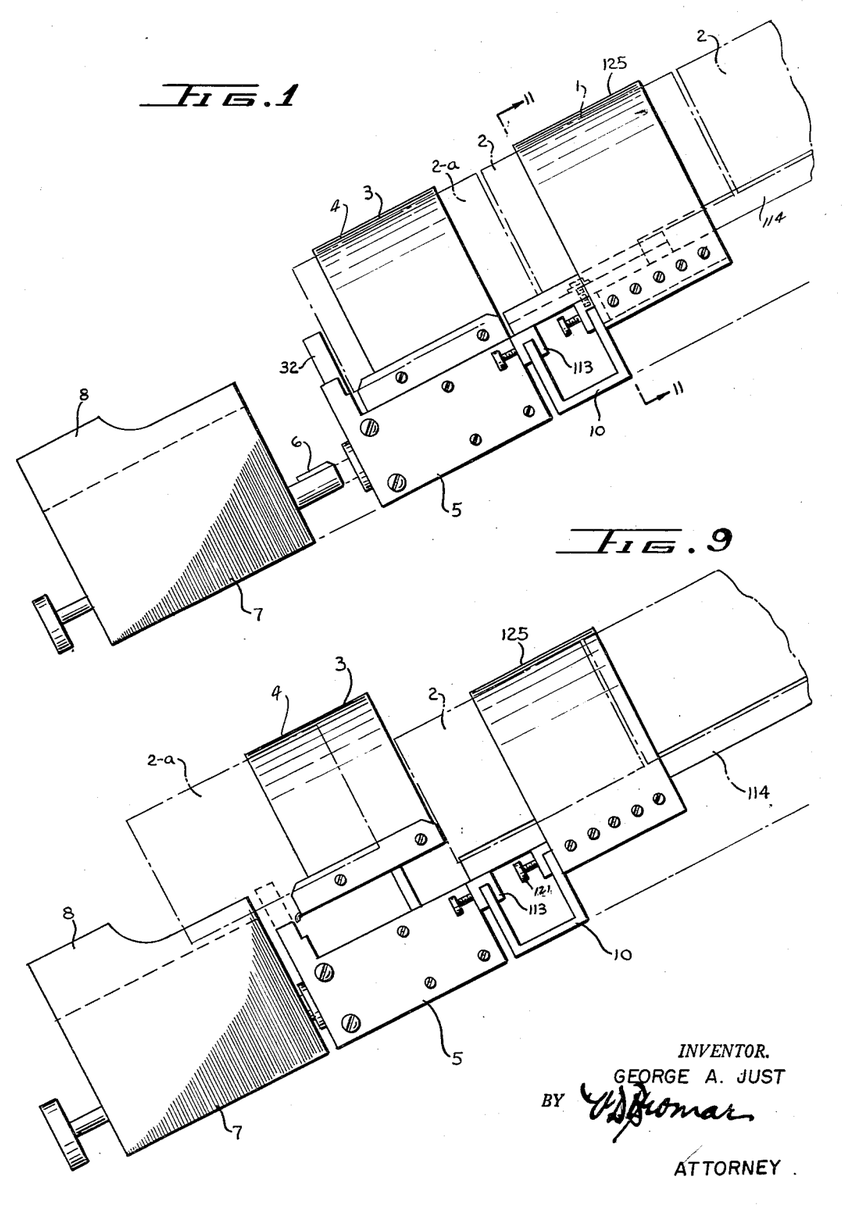
Figure 1 is a schematic view of the self-service system controlled herein showing a storage compartment disposed to feed into a display compartment controlled by the lock of this invention which automatically dispenses a displayed item of merchandise when the lock is opened.
Figure 9 is a schematic view of the storage and dispensing system, with a key operated in place and the display section moved to elevated delivery position relative to the receiving compartment on the key and in blocking position relative to the storage compartment chute.

As schematically shown in Figure 1, the general arrangement of the merchandise racks is such as to provide a covered storage or supply compartment which will be accessible from the rear to permit replenishment of items of merchandise 2. The storage compartment will feed merchandise forward into a delivery position in a display compartment 3 at the front of the storage and supply compartment. The display compartment is provided with a transparent cover 4 through which a customer can see one item 2–a of merchandise.

Access to the display compartment is controlled by the lock 5 of this invention. A key 6 for the lock 5 is part of a register 7 which is constructed to be operated by a price code element selectively inserted in the lock to operate the register when the register key is inserted into the lock to open the lock. The price code element is shaped with a coded contour to operate the register to add an amount corresponding to the price of the item of merchandise being dispensed through the compartment. The top of the key and register combination is preferably shaped to embody an article receiving surface constituting a receiving compartment 8 to receive the item of merchandise 2–a from the display compartment 3 and to serve as a receiving compartment to deliver the item to the customer. The receiving compartment 8 thus receives the item of merchandise from the display compartment 3 when the lock 5 has been operated to full open position. The customer thus may remove the item from the receiving compartment before removing the key and register from the lock.

The display compartment 3 is preferably so arranged relative to the receiving compartment 8 that the item of merchandise 2–a in the display compartment 3 will be moved by gravity onto the receiving compartment 8 to assure clearance of the display compartment 3 and to preclude jamming operation of the lock 5 by a customer as might otherwise occur upon a shift or displacement of the item of merchandise 2–a in the display compartment 3 if complete egression of item 2–a were not effected.

In order to provide greater flexibility for locating and arranging the several storage compartments 1 and the combination lock and display compartment units 3 and 5, a fixed guide and anchor channel 10 is disposed to serve as a front rail support at and at a right angle to the front or feed ends of a group of parallel storage compartments of a large storage and display service department of the store. The front ends of the respective storage compartments may then be adjustably shifted and selectively located in desired serving position along and at a right angle to the guide rail channel 10. The supporting frame for the supply compartment is supported on the rear flange of the channel 10 and the lock and its display chamber unit are supported on the front flange of the channel 10.

Figure 10:
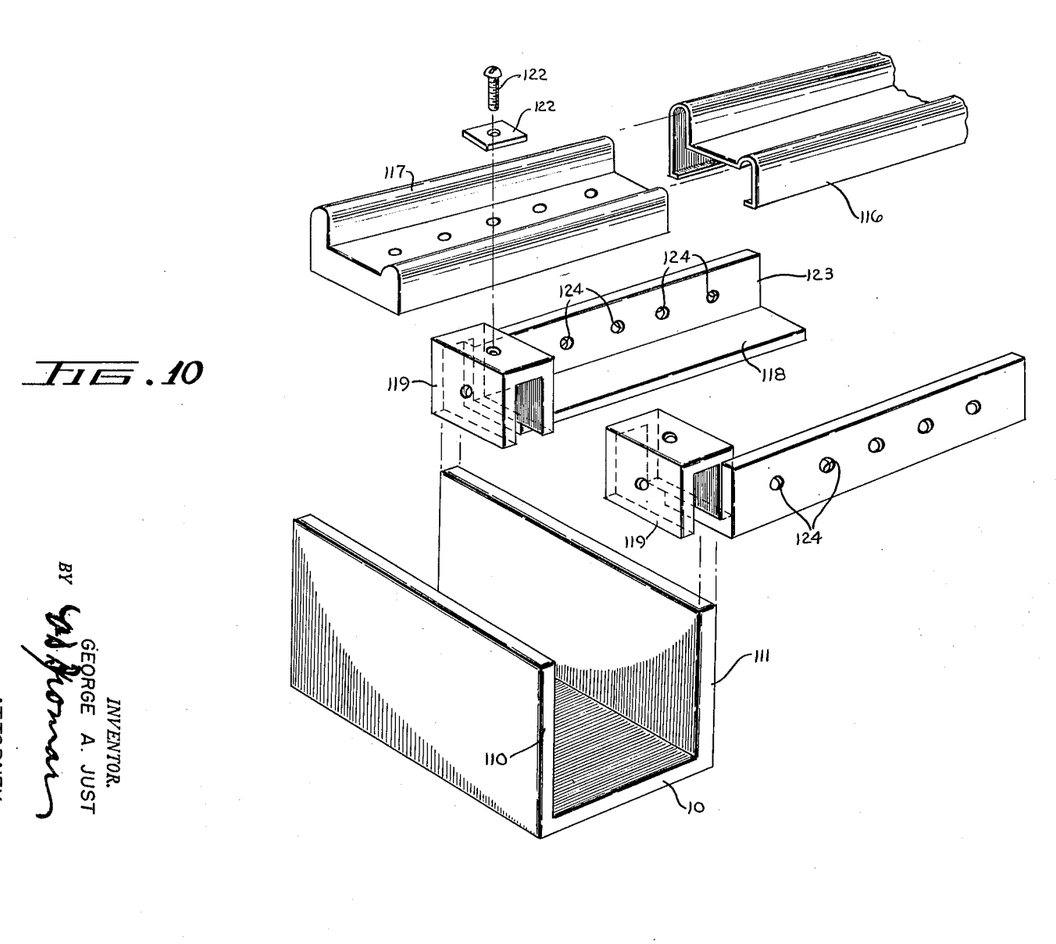
Figure 10 is a perspective view of the front end support for the storage chamber chute.

A preferred mounting arrangement is shown in more detail in Figure 10 showing adjustability of the front end of the feed storage compartment for various sizes of merchandise in connection with different sizes of platforms for the display compartment as hereinafter described.

Figures 2, 7, 11:
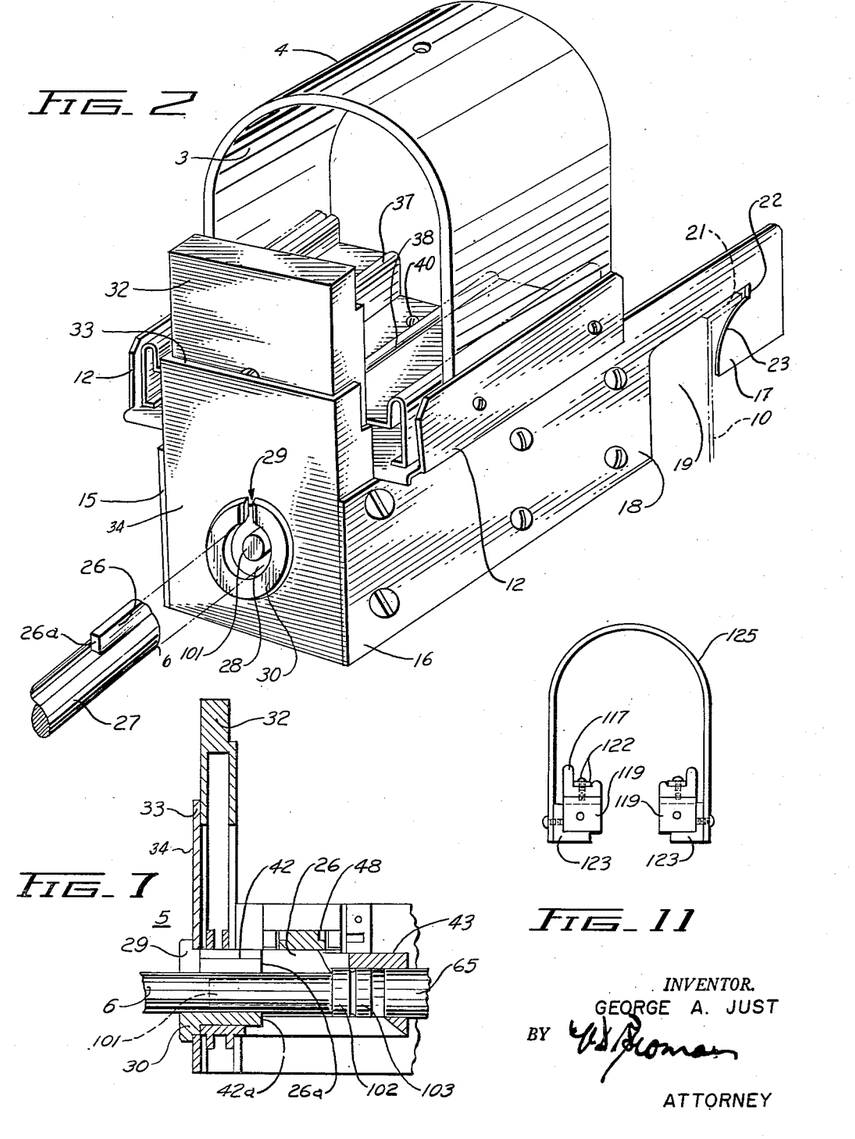
Figure 2 is a perspective view of the lock unit in its normal initial closed position with the key element of the operating register key shown in position about to enter the lock.
Figure 7 is a view, similar to Figure 6, of the front part of the lock with the key element in place.
Figure 11 is an elevational view of the front end of the storage compartment chute.

As shown in Figure 2, the lock and display compartment are constructed and assembled to constitute a unit to be applied and secured to the guide rail or channel 10 at a location in front of a storage compartment that is to be controlled by the lock 5. The display compartment 3 is shown as enclosed by the transparent cover 4, of appropriate size to accommodate the merchandise item and suitably anchored on side walls 12 to prevent pilfering.

In order to permit easy coupling of the lock to and uncoupling thereof from the guide rail 10, the lock unit 5 is shown provided with two side plates 15 and 16 (Figure 2) having rearwardly extending hook sections 17 spaced from the rear edges 18 of the side plates 15 and 16 to provide an open space 19 that will permit the lock unit as a whole to be lowered over a flange of a guide channel shown schematically here to represent any suitable clamping means for the lock on the guide rail 10. The lock unit may then be moved forward in such case, for example, to fix the lock in position by hemming the flange 21 in a slot 22 at the top of the arcuate surface 23 of the hook 17. This is an alternate means of securing the lock in position. Figures 1, 9 and 10 show, as hereinafter described, a preferred mounting of the lock.

The lock unit 5 may be otherwise additionally secured in position against undesired displacement, as in Figure 2, but the positioning thus far indicated will be sufficient to represent placement of the lock in proper position to permit it and its display compartment to be coupled to a selected storage compartment.

The first function of the lock, of course, is to prevent access to the display compartment until the lock has been operated by an authorized key.

As shown in Figure 2, an operating key 6 that is part of any suitable register and key device (otherwise not shown) is shown to have one boss or lug 26, for example, axially disposed on the peripheral surface of a tubular element 27 of appropriate dimensions to slide easily into the lock opening 28. For insertion, the boss or lug 26 of the key is held in position to enter a guide key slot 29 at the top of the entrance ring 30 at the mouth of the lock. Instead of having plain or smooth lugs as shown, the key may be provided with serrated edges for controlling several tumblers in the lock itself.

Figures 3, 6, 8:
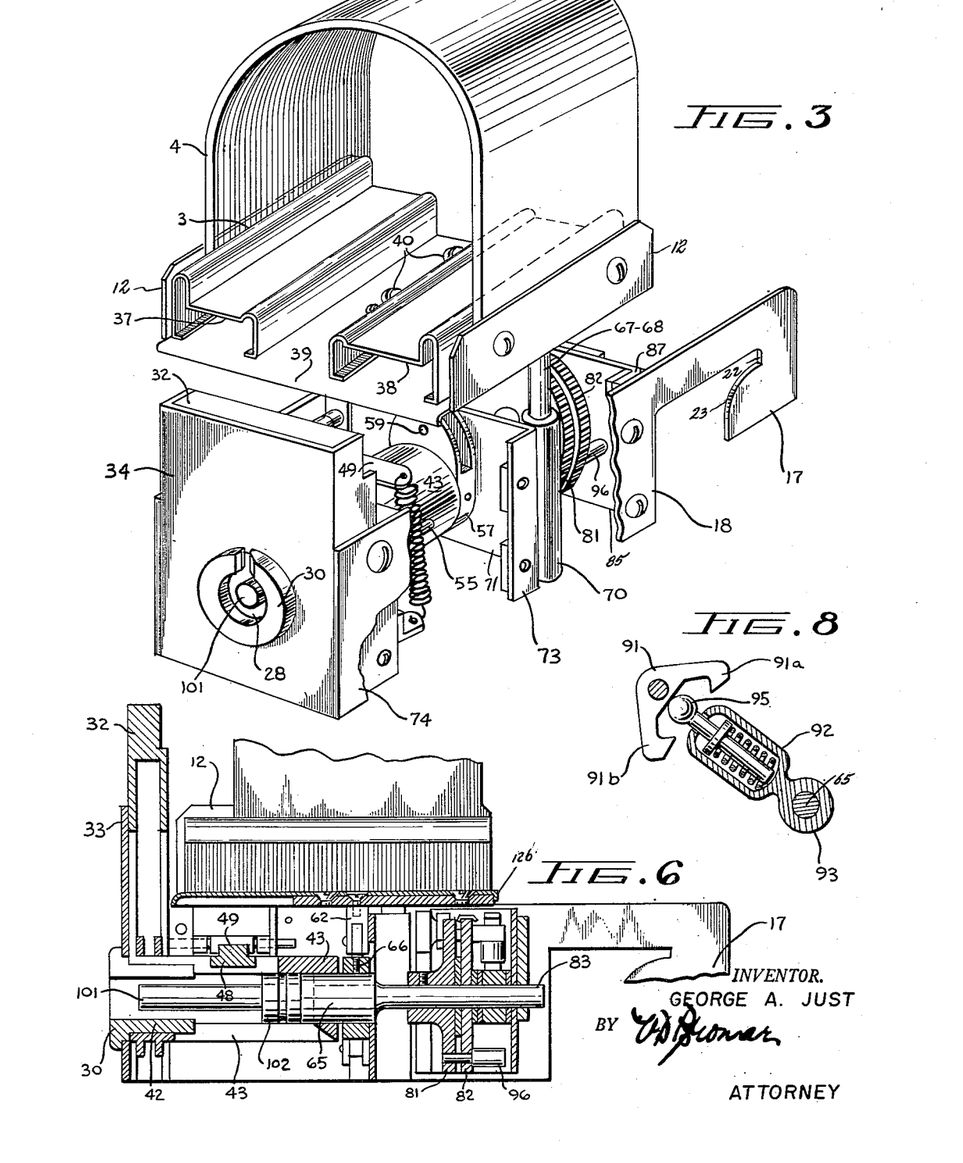
Figure 3 is a perspective view of a lock unit with portions broken away to expose some of the inner operating members, with the door moved to lowered or open position.
Figure 6 is a longitudinal side sectional view of the lock.
Figure 8 is a side view of the toggle mechanism for controlling the positions of the ratchet wheel pawls.

In the initial or normal locked position of the lock, the lock bolt 32 at the front of the lock is held in elevated position as in Figure 2 to extend above the top edge 33 of the front wall 34 and to serve as a door to the display compartment 3. When the lock is operated to its open position, the bolt or door 32 is lowered as shown in Figure 3 so that its top surface does not extend above the top surface 33 of the wall to permit movement of an item of merchandise into the receiving compartment 8 of the key register unit 7 as illustrated in Figure 9. At the same time, rising table 39 (Figure 3) raises the item in the display compartment high enough to slide over the top edge 33 and the top of lock door 32.

As shown in Figure 1, the item of merchandise moves automatically by gravity from the display section to a released position on the article receiving surface on the key when the lock is operated to open position.

In the construction disclosed herein, the structure of the display section 3 is utilized to perform an additional function, namely, to block the front end of the storage chamber and thereby to prevent the entrance of a subsequent item of merchandise into the display section 3 while the lock is being operated to open position and so long as the lock is in open position and until after the lock has been operated back to its closed position, at which time the door 32 is again raised to its elevated position to close the front of the display section 3.

In order to accomplish that additional function by the display section 3, that entire section 3 is arranged to be elevated when the lock is operated to lower the door 32.

The combination of lifting section 3 and lowering door 32 results in reducing the necessary travel of each element by half and, therefore, makes it possible to reduce the length of operating linkages, thereby reducing the size of the lock and providing higher blocking surfaces, making the lock more adaptable to a greater variation in size and shape of merchandise to be handled by the equipment without requiring a great many variations in sizes of the display compartment.

In order to accommodate items of different sizes and shapes, an entire display section 3 may be replaced on the associated mechanism of a lock 5. Correspondingly, suitable length transport racks 37 and 38 may be provided and secured to the floor 39 of the display section 3 in order to accommodate various sized merchandise items.

The size of the transparent cover 4 for the display section may then also be varied as necessary.

The lock unit, however, will be of one size, independent of the size of the display section. However, in order that the display section may be elevated and raised properly, the floor 39 of the display section will be arranged to permit simple and quick mechanical coupling and uncoupling to an elevator platform 41 (Figure 4) of the lock mechanism by suitable means, here illustrated as standard screws or bolts 40. When the lock is operated to open and thus lower the door 32, the platform 41 is elevated to raise the floor 39 of the display section above the top edge of the door. When the lock is subsequently operated to its closed position, the door 32 is raised and the platform 41, with the entire display section, is relowered to its normal initial position.

While the display section 3 is elevated, the rear edges of the floor 39 and of the transport racks 37 and 38, or other equivalent barriers when such racks may not be employed, will bar the front opening of the storage compartment in the path of forward movement of the subsequent items of merchandise from the storage compartment and serve thereby to prevent the entry of such articles into the display section 3 while that display section is in the elevated position.

When the display section 3 is lowered to its bottom position, corresponding to the normal locked position of the lock, a subsequent merchandise item may then be moved into the display section 3 by suitable means or by force provided for that purpose, for which gravity itself may be sufficient as illustrated herein.

Figures 4, 12:
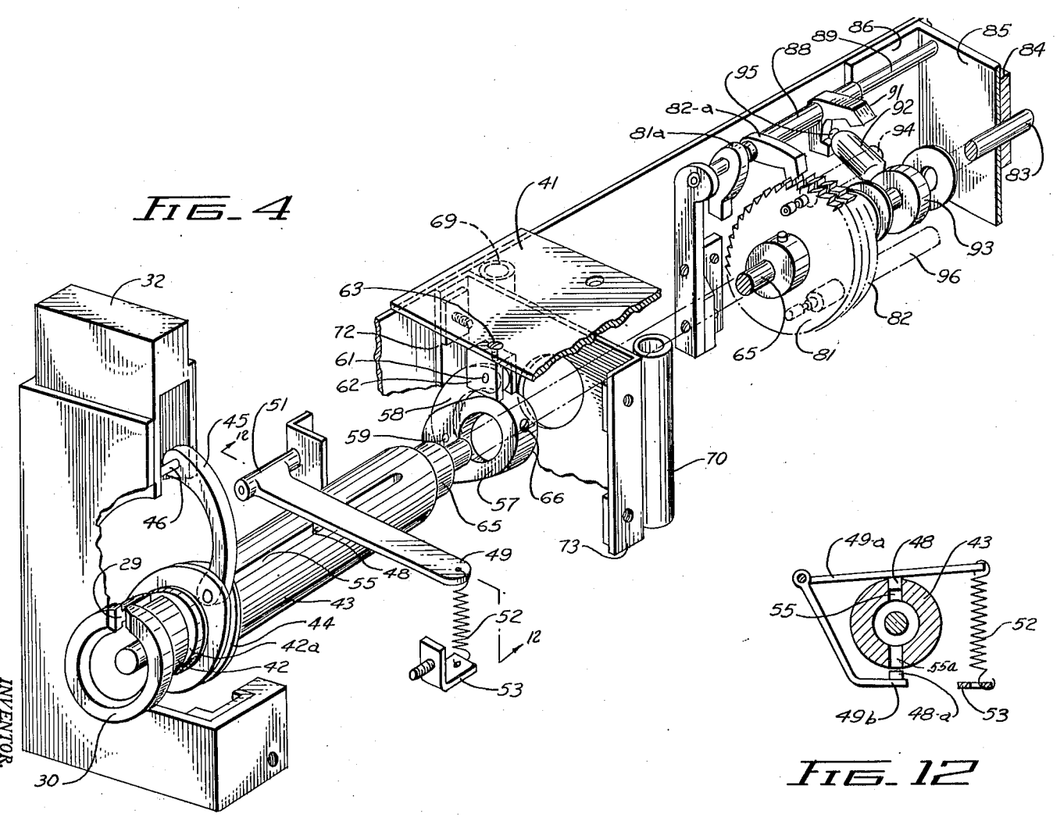
Figure 4 is a perspective exploded view of the lock in its initial or locked position with the door in its elevated or closed and blocking position.
Figure 12 is a cross-sectional view of a portion of the lock taken on line 12—12 of Figure 4 looking in the direction of the arrows.
Figure 5:
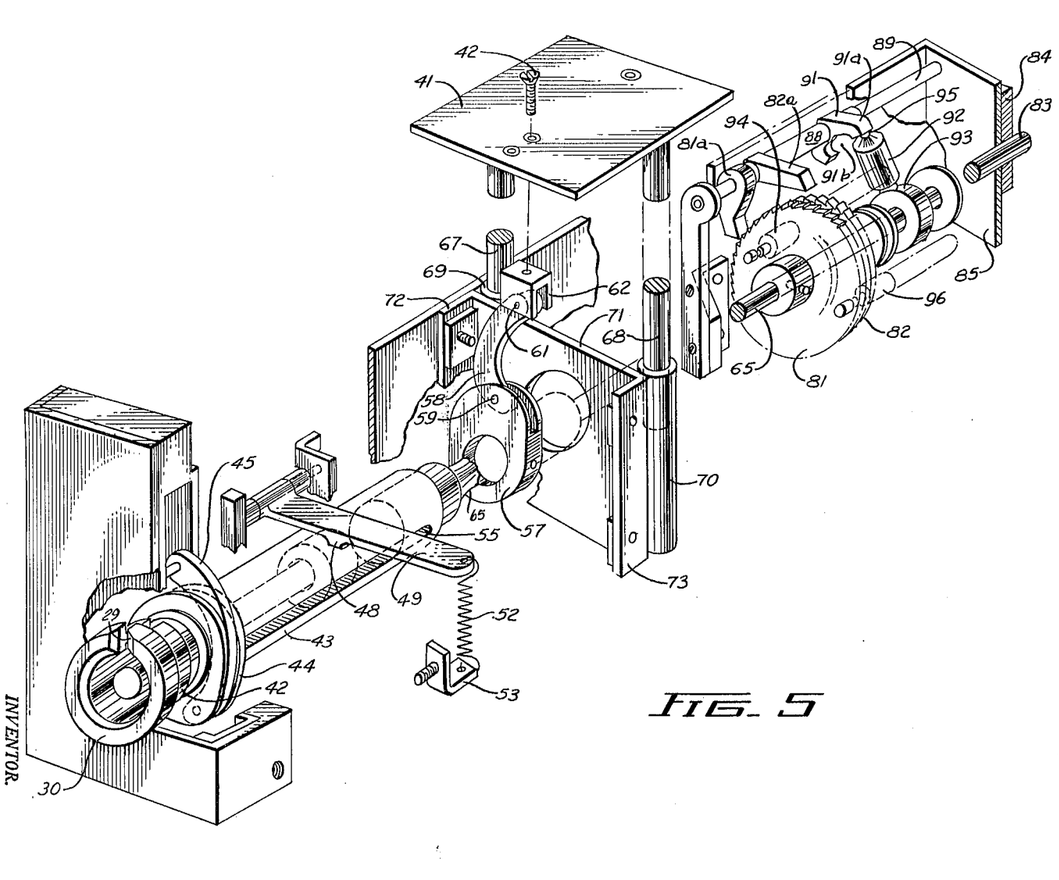
Figure 5 is an exploded view similar to Figure 4 with the door lowered to open or unblocking position.

Figures 4 and 5 may now be referred to for the details of construction whereby the operation of the lock opens and recloses the door 32 and simultaneously raises and lowers the platform 41 on which the display section is supported and secured.

As shown in Figure 4, the slotted entrance or guide ring 30 is stationary. The backwardly extending cylinder 42 serves as a bearing support for a cylindrical operating barrel 43 of the lock. Barrel 43 has a slot 55 alined with slot 29 of ring 30. The entrance ring 30 is fixed in position on the front face wall of the lock, and the slot 29 guides the lug 26 of the key 6 into proper initial position to open the lock. After the key is turned clockwise to open the lock, the key is held against removal until the lock is subsequently moved back to locking position. Such retention of the key is accomplished by the backwardly extending cylinder 42. The lug 26 on the key is dimensioned so its rear edge 26–a will seat and ride against the inner edge 42–a of the cylinder 42 as soon as and as long as the lug 26 is moved angularly out of alignment with entrance slot 29.

The front end of the barrel 43 serves as a shaft to support a double ring 44 which serves as a crank for a connecting rod 45 whose function is to raise and lower the door 32. One end of the connecting rod 45 is pivoted on a pin on the crank 44, and the other end of the connecting rod 45 is pivoted on a pin 46 that is anchored between two wall sections of the door 32. Clockwise movement of the lock barrel 43 lowers the bottom end of the connecting rod 45 and correspondingly lowers the top end to pull down the door 32.

In the initial locked position, the cylinder 43 is locked against rotation by a tumbler or detent bar 48 that is secured to and supported on the under surface of a pivoted arm 49. The arm 49 is pivotally supported at one end on a bearing pin 51 and spring biased at the other end by a spring 52. One end of the spring 52 is connected to the outer end of arm 49 and the other end is anchored on a stationary part of the structure, such as the bracket 53. The tumbler or detent bar 48 is biased by the spring 52 to drop longitudinally into a slot 55 in the peripheral surface of the barrel 43 when the barrel 43 is in locked position.

Insertion of the register key 6 into the ring 30 moves the lug 26 with its tapered front edge into the slot 55 of the locked barrel 43, whereupon the lug 26, as one of its functions, raises the detent bar 48 out of slot 55 so that the locked barrel 43 is then free to rotate.

Instead of a single tumbler 48, as shown here, a plurality of tumblers may be used, making the coding action operable by a serrated key of well-known type.

A modification of tumbler 49–a may be used, as in Figure 12, to prevent picking of the lock. Tumbler bar 49–a is similar to tumbler bar 49, plus a lower arm 49–b and detent 48–a. Excessive elevation of tumbler 48 from the slot 55 will force the lower tumbler 48–a into the lower slot 55–a and will prevent rotation of the cylinder 43. The key lug 26 will, of course, raise the tumbler 48 to the proper elevation, whereupon rotation of cylinder 43 will be allowed.

Clockwise rotation of the key 6 after full insertion and raising of tumbler 48 by key lug 26 will impart angular motion to the key lug 26. As its second function, the key lug 26 will impart corresponding clockwise angular motion to the lock cylinder 43. During the preliminary angular movement of the barrel, the lug 26 will serve to hold the detent bar 48 out of the cylinder slot 55 so that free rotation of the lock cylinder 43 may be initiated. As soon as the slot 55 crosses the orbit of the detent bar 48, the detent bar 48 can only ride on the peripheral surface of the lock cylinder 43 but will not be effective to impede its angular movement.

The key lug 26 has the additional important function of requiring insertion of the key to proper depth and then maintaining the key at proper insertion depth to assure proper recording of the item price on the register associated with the key. That control function is achieved by making the length of key lug 26 appropriate, according to the length and disposition of the price setting element so the rear end surface 26–a of key lug 26 will engage and ride against the inner edge surface of cylinder 42 as previously explained during angular movement of the key in the lock.

As previously explained, clockwise movement of the cylinder 43 will lower the door 32. By means of a similar construction on the cylinder 43 at its other end, an oppositely effective force is applied to the platform 41.

As shown in Figures 4 and 5, the crank 57 is operated by the lock cylinder 43, during clockwise rotation, to exert an elevating force on a connecting rod 58, which operates to transmit that elevating force to the platform 41. The connecting rod 58 is pivoted at one end on a pin 59 on the crank 57, and is pivoted at the other end on a pin 61 supported between the two walls of a U-shaped bracket 62 to which the platform 41 is secured by suitable means such as bolts 63.

In order to permit simple assembly of the parts of the lock, the inner end of the lock sleeve 43 is provided with a force-fitted shaft extension 65 which serves as a support for the crank 57. The crank 57 is tightly fixed to the shaft extension 65 by any suitable means, shown herein as a pin 66.

The platform 41 is provided with two guide rods 67 and 68 that are disposed to fit and slide into properly disposed guide cylinders 69 and 70. As shown in Figures 4 and 5, the two cylinders 69 and 70 are supported on a transverse wall 71 provided with flanges 72 and 73 by means of which the wall 71 may be secured to and supported on a side wall 74 (Figure 3) of the lock structure.

Up to this point it is clear that insertion of the register key into the lock cylinder removes the tumbler 48 to permit rotation of the lock cylinder 43, and clockwise rotation of that cylinder 43 then lowers the door 32 and elevates the platform 41 so that the display section will be elevated from its closed and locked position as shown in Figure 2 to its free, open and accessible position as shown in Figure 3.

Thereupon the merchandise item slides out of the display section 3 into the receiving section 8 on top of the key. Before the customer can remove the register key from the lock, however, it is made compulsory that the customer rotate his key counterclockwise, back to its entry position, in order that the key may be removed and be available to the customer for use at another display section to obtain some other item of merchandise.

During the return movement of the key, and consequent counterclockwise rotation of the lock cylinder 43, the platform 41 and the entire display section 3 supported thereon will be re-lowered to initial position, and the door 32 will be elevated to initial locking position to prevent access to the display compartment 3.

When the key is rotated to its counterclockwise closed or locked position, at which the door will be elevated to its closed position, the slot 55 in the lock cylinder 43 will be in alignment with the entry slot 29, and, upon removal of the key 27 from the lock, the tumbler or blocking bar 48 will be permitted to drop down into the cylinder slot 55 under the influence of the biasing spring 52.

The construction of the register and of the price setting element disposed in the lock and their cooperation to record the price of an item of merchandise on the register require the operation of the lock through a complete opening and reclosing cycle.

To assure such operation through a complete cycle each time the lock is operated, removal of the key from the lock is prevented unless the lock is operated through the prescribed complete cycle. The customer is thus compelled to complete the prescribed cycle of operation in order to obtain an item of merchandise, to have the key available for use at another storage compartment and to leave the lock in proper position for the next customer.

The cycle of operation of the lock is predetermined and controlled by ratchet wheels 81 and 82 that are fixedly secured on the shaft extension 65 secured to the inner end of the lock cylinder 43. The extreme other end 83 of the shaft extension 65 is provided with suitable bearing support, shown by way of illustration as a bearing plate 84, secured to and supported on an end wall plate 85 having side flange sections 86 and 87 by means of which the end wall plate 85 may be secured to the side walls of the lock structure.

The two ratchet wheels 81 and 82 are secured to rotate as a unit with the supporting shaft extension 65. The ratchet wheel 81 is provided with a detent pawl 81–a and the ratchet wheel 82 is provided with a detent pawl 82–a. Both pawls are fixedly secured on a common sleeve 88, which is supported for angular movement on a fixed shaft 89.

A detent control arm 91 is also fixedly secured to the sleeve 88 to control the position of the detents 81–a and 82–a, by rocking the sleeve through a limited angular motion.

As shown in Figure 8, the movement of the detent control arm 91 is effected and controlled by a radial arm 92, consisting of a radial tube containing a spring-biased rod 95 that acts as an over-center or toggle spring with the control arm 91, in moving the detent control arm 91 in either direction.

As indicated in Figure 4, clockwise rotation of the lock cylinder 43 from initial locking position may be freely effected, since the pawl 81–a is raised from its ratchet wheel 81 and the rotation of the ratchet wheel 82 is in proper direction away from its detent 82–a. Such clockwise rotation of the lock cylinder 43 may continue until the detent 82–a, controlled by arm 91 is raised and shifted slightly counterclockwise by the radial arm 92. That radial arm 92 is fixedly supported on a ring 93 that is in turn supported for free angular movement upon the lock cylinder extension shaft 65.

Since the ring 93 is supported for free angular motion on the shaft extension 65, the actual operation to position the radial arm 92 is accomplished by an eccentric pin 94 that is fixedly secured near the periphery on the outer side of the ratchet wheel 82.

Thus, when the lock cylinder 43 is operated by the customer to the predetermined terminal position of the unlocking operation, the eccentric pin 94 will engage the radial arm 92 and move it clockwise to cause the spring biased rod 95 to move past center on control arm 91 to the horizontal arm 91–a and raise that arm 91 through a small angle counterclockwise. A stop on arm 91–a limits the movement of the spring biased rod 95 to spring load the detent control arm 91–a. The counterclockwise movement on detent control arm 91 is imparted to the shaft sleeve 88 and thereby to the pawl 82–a and to the pawl 81–a. Pawl 82–a is removed from its ratchet wheel 82, but the pawl 81–a is moved counterclockwise into blocking or detent position against the teeth of the ratchet wheel 81.

The two pawls 81–a and 82–a are now in the positions indicated in Figure 5. Free clockwise rotation of the lock cylinder 43 is no longer possible, but the lock cylinder 43 may now be freely rotated counterclockwise.

After the customer has received the desired article of merchandise that she wishes to purchase, the reverse or counterclockwise rotation of the operating key 6 to its withdrawal position causes corresponding counterclockwise rotation of the lock cylinder 43 and its shaft extension 65 with consequent simultaneous corresponding counterclockwise rotation of the ratchet wheels 81 and 82 until the lock cylinder 43 is moved back to the initial position where the slot 55 is in direct alignment with the entry slot 29. When the lock cylinder 43 reaches that position, a second limited control eccentric pin 96 on the detent wheels 81 and 82 engages the front side of the radial control arm 92 and forces that arm in a counterclockwise direction from underneath the horizontal detent control arm 91–a, past center to under the other or vertical arm 91–b. A stop on that arm 91–b limits the movement of the radial arm 92 and the effective toggle action between radial arm spring biased rod 95 and the detent control arm 91 spring loads the sleeve 88 and pawls 81-a and 82-a. Figure 8 shows the toggle control for arm 91.

As soon as the radial arm 92 moves through the short angle sufficient to toggle the control arm 91 to its other position, the detent 82-a is moved clockwise into engagement against the teeth of its associated ratchet wheel 82 to prevent further counterclockwise rotation of that ratchet wheel and, consequently, to prevent further counterclockwise rotation of the lock cylinder 43 and its extension shaft 65.

The mechanism of the lock is now all back in the original position illustrated in Figure 4, and the key may then be freely withdrawn from slot 55 of the lock cylinder 43, out through the slot 29 in the entrance ring 30.

As soon as the key is withdrawn and the lug 26 removed from underneath the locking bar or tumbler 48, that bar 48 is moved down into the slot 55 of the lock cylinder 43 under the influence of the biasing spring 52 to prevent rotation of the lock cylinder until an authorized key is subsequently inserted into the lock.

An additional function which must be performed by the lock during the purchasing operation is to react on the register key mechanism to cause the register to record an amount corresponding to the price of the merchandise that is being selected by and delivered to the customer through the display section controlled by the lock.

To accomplish that price recording function the lock is provided with a pricing element having a contour surface mechanically shaped or coded to suitably complement the recording mechanism on the register so the complete movement of insertion and rotation of the register key into the lock mechanism will be attended by a reaction force on the coded pricing element in the lock acting on the key in the lock onto and against the complementary mechanism in the register to actuate that mechanism by an amount corresponding to the price of the merchandise being delivered from the rack controlled by that particular lock and pricing element.

The longitudinal sectional view of Figure 6 shows the compact structure of the mechanism of a lock 5 and the disposition of a pricing code element 101 which operates the register associated with any key that is used to open the lock 5.

Figure 7 shows the front portion of the lock 5 with the key 6 of Figure 2 fully inserted. The tube 27 is fitted over the shaft of the price code element 101 up to the head 102 which together with a second head piece 103 makes a tight fit in the cylinder barrel 43. Figure 7 shows how the back edge 26-a of the lug 26 rests and rides against the inner edge 42-a of the backwardly extending cylinder 42.

Figure 8 shows the toggle arrangement whereby radial arm 92 controls the position of arm 91 for positioning the pawls 81-a and 82-a.

Figure 9 shows schematically the blocking action of the display section 3 when it is raised to elevated position corresponding to open position of the lock and the door 32. The door 32 has been lowered from its normal raised position, shown dotted, to a level below the floor of the display compartment 3 so the front end of display compartment 3 is open and the item of merchandise will fall out. At the same time, the floor of display compartment 3 blocks the front end opening of the storage compartment 1 to prevent access thereto through the display compartment and to prevent movement of an item of merchandise from the storage compartment into the display compartment.

Figure 10 shows some additional details of mounting members for securing the locks and the racks or chutes of the storage compartments to the guide rail channel 10. In the arrangement as shown in Figure 10, the channel 10 is shown with straight flanges or side walls 110 and 111. With such a channel 10, the lock is provided with two channel brackets (see Figures 1 and 9) of inverted U-shape suitably anchored to the lock structure at the rear thereof and disposed to permit the brackets and the lock supported by them to be adjustably shifted along channel 10 to proper position in front of a storage compartment to be controlled thereby.

Each storage compartment is provided with a suitable chute 114 (Figure 9) and cover 125 to constitute the storage compartment for the merchandise. The chute is disposed to incline forwardly so merchandise will move forward by gravity to the display compartment controlled by the lock. The chute may be formed of any suitable material as a floor to feed onto a pair of tracks 116 adjustably positionable longitudinally on respective track supports 117 by simple telescoping action. The track supports 117 are in turn adapted to be quickly attachable to and removable from anchor plates 118 secured to and supported from channel brackets 119 of inverted U-shape to permit those brackets and the anchor plates to be adjustably shifted along the guide rail channel 10 for desired positioning of the front end of the associated storage compartment chute. The U-shaped brackets 112 and 113 for the lock and brackets 119 for the storage compartments are provided with suitable set screws 121 for locking them in place against unauthorized movement on guide rail channel 10.

The track support 117 is attached to its anchor plate 118 by suitable single means such as a bolt 122. The track 116 may then be easily telescoped over the support 117 for front end support for the track. The anchor plate 118 is secured to its U-shaped bracket 119 by welding. Each anchor plate 118 is provided with a side wall 123 having several bolt holes 124' to permit attaching a transparent tunnel cover 125 such as "Plexiglas" over the front end of the storage compartment if the entire compartment is not otherwise entirely so covered.

The storage compartment cover 125 makes it impossible for a customer to manipulate the item in the storage compartment up onto the display compartment platform while the display compartment is open for delivery of the item in the display compartment.

Upon reference to Figures 1, 9 and 10 it will be clear that the storage compartment chutes and the locks are independently applicable and positionable along the guide rail channel 10. The size of a display section unit will be determined by the size of the item of merchandise to be handled and dispensed. The lock structures are of one size so only a display section unit need be varied to accommodate a lock to a merchanise item of different size. Flexibility in such application and adjustment is provided by the adjustability of "Plexiglas" cover 124 on the front end of the storage compartment chute on the side wall 123 of the plate 118.

In addition, the transparent cover 4 on the display section would be available in various widths to be secured to the side walls 12 of the floor unit 39 to be secured to the lock elevator platform 41.

In the foregoing I have described my invention solely in connection with preferred and illustrated embodiments thereof. Since many variations and modifications of my invention will now be obvious to those skilled in the art, I prefer to be bound not by the specific disclosures herein contained but only by the appended claims.

I claim:

1. In a self-service system including a storage compartment for a supply of units of merchandise, a display compartment movable into and out of position to receive a unit from the storage compartment, and a key having a receiving compartment movable into position to receive an item of merchandise from the display compartment for delivery to a customer upon movement of the display compartment out of said unit receiving position, a lock for the display compartment to be opened by said key temporarily loaned to a customer for the purpose of the purchase, said lock comprising an angularly movable cylinder, a tumbler or blocking bar therefor, an entrance ring to admit said key in a predetermined position corresponding to locked position of the cylinder to enable such key to enter the cylinder and expel the blocking bar to permit subsequent angular movement of the cylinder; a door movable between open and closed terminal positions at the front of the display section; means supported on and actuable with the lock cylinder to move the door and display compartment to desired positions; and means for preventing withdrawal of the key until the cylinder has been moved through a predetermined operation.

2. The combination as in claim 1, comprising, additionally, means movable with the cylinder to prevent reversal of direction of movement of the cylinder between full open and full closed terminal positions of the door at the front of the display section until the movement initiated in either direction, from open or from closed position of the door, is completed.

3. The combination as in claim 1, comprising, additionally, means secured to the cylinder for selectively preventing angular movement of the cylinder in either direction, unless and until a movement of the door initiated in either direction is continued to completion through a predetermined angular movement of the cylinder.

4. The combination as in claim 1, comprising additionally, means for permitting or preventing movement of the cylinder in advancing direction, means for permitting or preventing movement of the cylinder in return direction, and means for controlling said permitting and preventing means to enable the cylinder to move angularly only in an initially selected direction until the fully opened or fully closed position of the door is reached.

5. The combination as in claim 4, in which the controlling and permitting means insuring complete opening or complete closing of the door include two reversely operating ratchet wheels and associated pawls, and means for rendering one pawl or the other effective.

6. The combination of a cylinder operable by an external key and having a longitudinal slot in its periphery to receive such key, a key guide to guide and direct an external key into the cylinder slot, a spring-biased tumbler or blocking bar disposed to engage the slot when the cylinder is in initial or locking position, said tumbler being movable out of the slot by the key when the external key is fully inserted into the slot, a platform to receive and support a compartment for displaying and dispensing a merchandise item, a door movable to closing position to bar access to the merchandise space in the display compartment and movable to open position to permit such access, means controlled by the cylinder for moving the door to selected position and a key for said lock having means thereon for receiving and supporting an item of merchandise upon movement thereof from said platform.

7. The combination as in claim 6, including, also, means for elevating and lowering the platform, said means serving to elevate the platform during door-opening operation and to lower the platform during door-closing operation, and means controlled by movement of the cylinder for controlling said elevating and lowering means, and said door-operating means.

8. The combination as in claim 7, in which the door and the platform are simultaneously moved in opposite directions, thereby to effectively double the relative movement of the door and the display section in providing access to that section when the lock is operated to open the door.

9. The combination as in claim 8, in which the platform is inclined to slope downwardly toward the door, to enable gravity to expel the displayed item of merchandise out of the display compartment when the door is moved to full-open position and said platform is in its elevated position.

10. A self-service system comprising a storage compartment, means constituting a movable display compartment serving as a transfer passage from the storage compartment and disposed at the front end of the storage compartment, said display compartment being adapted to receive an item of merchandise from the storage compartment through the rear end of the transfer passage and to dispense the item through the front end of the transfer passage formed by the display compartment, a door to bar the front end of said display compartment, a lock for moving the door into and out of item releasing position, a key for the lock, and means controlled by the lock during door-moving operation for moving said display compartment into position for blocking the front end of the storage compartment while the door is open to permit release of an item from the display compartment.

11. A self-service system as in claim 10, in which the means constituting the display compartment embodies an element movable in a direction opposite to the door and to blocking position and to unblocking position at the front end of the storage compartment, and means operable by the lock to move said movable element to blocking position to prevent access to the storage compartment through the display compartment when the door to the display compartment is opened.

12. A self-service system as in claim 10, in which operation of the lock to open the door at the front end of the display compartment serves also to move the means constituting the display compartment to a position at the front end of the storage compartment, at which the display compartment means serves as a barrier to block access to the storage compartment through the display compartment and to prevent passage of an item of merchandise from the storage compartment to the display compartment so long as the door at the front of the display compartment is open.

13. A system as in claim 12, in which the display section embodies a sloping element to support an item of merchandise to be dispensed, so gravity will expel such item when the door is moved to open position, and in which the key embodies means to constitute and provide a receiving section for receiving and catching the item of merchandise expelled by gravity from the display chamber.

14. The combination with a storage section and a display compartment for containing and displaying a supply of non-removable merchandise and for moving the merchandise forward to a dispensing outlet of the display compartment, said display compartment communicating with said dispensing outlet to receive a merchandise item from the storage section and a receiving means serving to make the merchandise item available to a customer, said display compartment having a floor and a cover to define a space to accommodate the item of merchandise that is to be made accessible, a lock operable by an external key and having means for moving said display compartment and receiving means into registration for release of an item of merchandise, a door operable by the lock to open or to closed terminal positions upon actuation by such an external key, and being effective at its closed terminal position to bar access to the display section and providing access to the display section when moved to its open terminal position.

15. The combination with a closed merchandise supply compartment, of a display section movable into a position to be fed from the supply compartment and having a front opening to be accessible to a customer to permit removal of an item of merchandise from the display section, a lock, means for holding said lock in fixed position with respect to the supply compartment, said lock having a door movable to closing position to bar the front opening of the display section or to open position to expose said front opening, said lock being operable by an external key to be supplied to a customer, said key having an article receiving surface thereon and said display section being movable into and out of registry with said article receiving surface upon operation of said key.

16. The combination set forth in claim 15, in which the display section embodies a sloping element to support an item of merchandise, so gravity will expel such item when the door is moved to open position.

17. The combination as in claim 15, in which the lock is provided with a rotatable cylinder, a tumbler blocking bar normally biased to block the cylinder but expellable by the key to permit subsequent rotation of the cylinder by the key and means operable by the cylinder while the cylinder is moving the door to open position for simultaneously blocking the storage compartment for preventing passage of merchandise from the storage compartment to the display section and for likewise preventing access to the storage compartment through the display section.

18. The combination as in claim 17, in which the lock further comprises means for preventing removal of the key after initial movement of the cylinder in either direction from either terminal open or closed position, unless and until the full prescribed door actuating movement of the cylinder in said selected direction is completed.

References Cited in the file of this patent

UNITED STATES PATENTS

| | | |
|---|---|---|
| 351,011 | Wherry | Oct. 19, 1886 |
| 1,404,280 | Dixon et al. | Jan. 24, 1922 |
| 1,446,603 | Wenneborg | Feb. 27, 1923 |
| 1,572,263 | Ash | Feb. 9, 1926 |
| 1,709,192 | Richardson | Apr. 16, 1929 |
| 1,929,985 | Main | Oct. 10, 1933 |
| 1,969,594 | Dietrich | Aug. 7, 1934 |
| 2,113,989 | Klemt | Apr. 12, 1938 |
| 2,127,769 | Esgro | Aug. 23, 1938 |
| 2,176,384 | Varney | Oct. 17, 1939 |
| 2,206,462 | Jacobi | July 2, 1940 |
| 2,260,643 | Rosan | Oct. 28, 1941 |
| 2,277,916 | Klemt | Mar. 31, 1942 |
| 2,315,659 | Russell | Apr. 6, 1943 |